(12) United States Patent
Liu et al.

(10) Patent No.: US 11,159,018 B2
(45) Date of Patent: Oct. 26, 2021

(54) METHOD AND SYSTEM FOR ONLINE DECISION MAKING OF GENERATOR START-UP

(71) Applicant: SHANDONG UNIVERSITY, Shandong (CN)

(72) Inventors: Yutian Liu, Jinan (CN); Runjia Sun, Jinan (CN)

(73) Assignee: SHANDONG UNIVERSITY, Shandong (CN)

( * ) Notice: Subject to any disclaimer, the term of this patent is extended or adjusted under 35 U.S.C. 154(b) by 259 days.

(21) Appl. No.: 16/348,190

(22) PCT Filed: Sep. 29, 2018

(86) PCT No.: PCT/CN2018/108531
§ 371 (c)(1),
(2) Date: May 8, 2019

(87) PCT Pub. No.: WO2019/184286
PCT Pub. Date: Oct. 3, 2019

(65) Prior Publication Data
US 2020/0127457 A1 Apr. 23, 2020

(30) Foreign Application Priority Data
Mar. 29, 2018 (CN) .......................... 201810271593.3

(51) Int. Cl.
*H02J 3/06* (2006.01)
*G05B 19/042* (2006.01)
*G06N 3/08* (2006.01)

(52) U.S. Cl.
CPC .............. *H02J 3/06* (2013.01); *G05B 19/042* (2013.01); *G06N 3/08* (2013.01); *G05B 2219/2639* (2013.01); *H02J 2203/20* (2020.01)

(58) Field of Classification Search
CPC . H02J 3/06; H02J 2203/20; H02J 3/00; G05B 19/042; G05B 2219/2639;
(Continued)

(56) References Cited

U.S. PATENT DOCUMENTS

2011/0221907 A1* 9/2011 Smart ................... F16M 11/18
348/158
2014/0163756 A1* 6/2014 Idrees ................... G06Q 50/06
700/291
(Continued)

FOREIGN PATENT DOCUMENTS

CN 101236575 A 8/2008
CN 103279620 A 9/2013
(Continued)

OTHER PUBLICATIONS

Jan. 3, 2019 Search Report issued in International Patent Application No. PCT/CN2018/108531.
(Continued)

*Primary Examiner* — Ziaul Karim
(74) *Attorney, Agent, or Firm* — Oliff PLC

(57) ABSTRACT

A method and system for online decision making of generator start-up, determining the lines to be restored step by step based on the real-time power system data to guide the initial stage. The black-start unit is determined, and the units waiting to be restored are selected from all units. The training set including labeled samples to establish a value network. During generator start-up, the blackout area is judged, the state of power system is identified, the availability of equipment is judged, and the characteristics of generators are collected. The total generation capability is used as search objective for Monte Carlo tree search. Based on the value network, Monte Carlo is applied to search the next line to be restored during generator start-up. Parallel computation adopted to check the constraints for the resto- (Continued)

ration of alternative lines. The results of Monte Carlo are summarized to determine the line to be restored next.

11 Claims, 6 Drawing Sheets

(58) Field of Classification Search
CPC ........ G06N 3/08; G06N 3/006; G06N 3/0454; G06N 5/003; G06N 7/005; G06N 20/00; Y02E 60/00; Y04S 40/20; Y04S 10/50
See application file for complete search history.

(56) References Cited

U.S. PATENT DOCUMENTS

| | | | |
|---|---|---|---|
| 2015/0256094 A1* | 9/2015 | Chaudhuri | H02M 5/4585 363/35 |
| 2016/0139212 A1* | 5/2016 | Lin | G06F 30/367 702/108 |

FOREIGN PATENT DOCUMENTS

| | | |
|---|---|---|
| CN | 107244312 A | 10/2017 |
| CN | 108429259 A | 8/2018 |
| WO | 2009/112955 | 9/2009 |

OTHER PUBLICATIONS

Jan. 3, 2019 Written Opinion issued in International Patent Application No. PCT/CN2018/108531.

* cited by examiner

METHOD AND SYSTEM FOR ONLINE DECISION MAKING OF GENERATOR START-UP

FIELD OF THE INVENTION

The present invention is related to a method and system for online decision making of generator start-up.

BACKGROUND OF THE INVENTION

Along with the development of social economy, the electricity consumption is increasing rapidly. The dynamic behaviors and structure of power networks are becoming more and more complex, which increases the difficulty of power system operations. Improper handling of partial faults and natural disasters is likely to lead to cascading failures and even large-scale blackouts. For example, in 2003, a short circuit fault occurs on a 345 kV transmission line in Ohio, USA. Due to an improper handling of the fault, a large-scale power flow transfer occurs, and further leads to cascading trips. The cascading failure led to the most serious blackout in south America. 6.18 GW load was lost and about 50 million people were influenced. On Jul. 30 and 31, 2012, two large-scale blackouts occurred in northern and eastern India, covering more than half of the country and directly affecting the lives of more than 600 million people. The operation experience of power systems indicates that although a large number of applications of new technology and equipment in power systems can improve the stability and reliability of system operation, blackouts are still unable to be avoided, especially blackouts caused by natural factors.

Because the electricity plays a very important role in social production and life, long-time and large-scale blackouts can lead to serious economic losses, and even threaten national security. In recent years, several blackouts sound the alarm for us. Electricity companies successively developed their black-start schemes in recent years.

Generator start-up is the foundation of power system restoration after blackouts. On the premise of satisfying all constraints, the start-up sequence of generators and the corresponding restoration paths should be optimized to start main generators and connect them to the restored network as soon as possible, which is the key to enhance the strength of the restored system and provide power generation for the subsequent load restoration. Generator start-up methods in the existing researches are all offline methods, which make a restoration scheme based on the assumed blackout scenarios and the predicted restoration process. However, the actual scenarios and restoration process may be different from the assumed ones. Thus, a restoration scheme established offline may not be implemented in practice. Even worse, it may lead to prolonged restoration process.

SUMMARY OF THE INVENTION

An online decision-making method is proposed to solve the above-mentioned problems. For the uncertainty of initial power system state after blackout and line restoration situation during restoration, Monte Carlo tree search and deep learning are combined for an online decision making of generator start-up. The method can improve the robustness of obtained schemes facing uncertainty by searching different possible subsequent restoration situations. Based on real-time situations of power systems, the method can determine next transmission lines to be restored online to provide cranking power for generators waiting to be restored step by step.

To achieve the above purposes, the present invention adopts the following technical scheme.

The present invention discloses an online decision-making method for generator start-up, which includes the following steps:

(1) Determining a black start unit, and selecting the units that need to be started from all units;

(2) Generating a labeled training set that covers different possible states of generator start-up. Based on the training set, utilizing deep learning to establish a value network;

(3) Obtaining real-time data of generator start-up, judging blackout area and the availability of equipment in the system, and identifying the state of the system;

(4) Searching and evaluating alternative lines to be restored in next step with Monte Carlo tree search and value network. Checking the voltage, frequency and power flow variations caused by the restoration of different alternative lines;

(5) Summarizing the results of Monte Carlo tree search, and restoring the corresponding transmission lines.

Further, according to the actual situation of the power system, a hydro-power generator, pumped-storage power generator or gas turbine generators is selected as the black-start unit.

Further, the units that need to be started is selected based on the following principles:

1) Selecting the units of which the capacity is between 300 MW and 600 MW;

2) Selecting the units which belongs to big capacity power plants;

3) Selecting the units near critical loads.

Further, according to the system data, a labeled training set covering different possible states of generator start-up is generated. One generator start-up state is a sample in the training set. The specific method is as follows:

1) Generating all possible sets of generator status through traversal, wherein assuming there are N generators in a system, the number of sets of generator status needing to be generated is $C_N^1 + C_N^2 + \ldots + C_N^{N-1}$;

2) Setting that $L_{num}$ is the number of sets of line status when generator status is fixed and $D_{num}$ is the number of sets of generator downtime when generator and line status is fixed;

3) Generating line status randomly and verifying topological connectivity of the generated network based on a principle, wherein all restored lines are required to be able to connect the restored units and the black-start unit and adjusting the line status in the disconnected network;

4) Calculating expected recovery time of all restored lines and downtime of each unit;

5) Adopting a particle swarm optimization algorithm to optimize a maximum total generation capability in a generated power system situation for the corresponding total generation capability as a sample label, wherein the power system situation is represented as a certain sample.

Further, the value network is a trained based on the training set. A sparse autoencoder with 3 hidden layers is established to train the labeled sample. The input is the status of generators, status of lines and downtime of generators, and the output is the optimal value of the total generation capability.

Further, the state of the system is identified. After a transmission line is restored, the availability of all electrical equipment and the downtime of all unrestored units is identified.

Further, total generation capability is set as the search objective to search the alternative lines with Monte Carlo tree search and value network. The specific method is as follows:

1) Selection: Starting from the root node, after calculating modified upper confidence bound apply to tree (MUCT) value of each node, selecting a node with the largest MUCT value for further expansion or simulation;
2) Expansion: Eliminating the nodes which represent impossible generator start-up situations in reality with the move pruning technique as follows: First, by searching reversely from the node which is waited to be expanded to the root node, marking the nodes which have the same parent node; Then, avoiding the marked nodes in the new expansion until a new NBS unit is linked to the backbone network;
3) Simulation: Estimating subsequent optimal total generation capability with value network according to the status of the system, improving the selected probability of the alternatives with a higher total generation capability to guide the simulation process;
4) Backpropagation: Updating the parameters of each node in the tree reversely after the simulation is completed.

Further, the line to be restored in next step is determined based on a weighted total generation capability, shown as follows:

The value of the weighted total generation capability of the mth alternative is equal to the sum of ration between the index value of each simulation result of the mth alternative and the number of restored lines of the mth alternative in each simulation.

The present invention discloses a system for online decision-making of generator start-up, including:

A module used to determine the black-start unit for generator start-up;

A module used to select the units waiting to be restored from all units;

A module used to generate labeled training set that covers as much generator start-up status as possible;

A module used to establish value network;

A module used to obtain real-time data of generator start-up, judge blackout area, identify the state of the system, judge the availability of equipment in the system, and obtain the characteristics of generators waiting to be restored;

A module used to search the next line to be restored with Monte Carlo tree search and value network;

A module used to check the voltage, frequency and power flow variations caused by the restoration of alternative lines;

A module used to summarize the results of Monte Carlo tree search, and select the next restored transmission line.

The advantages of the present invention are summarized as follows:

1) The core innovation of the designed online decision-making method of generator start-up based on deep learning and Monte Carlo tree search is that it can determine lines to be restored step by step based on the real-time power system data to guide generator start-up in the initial stage of power system restoration;
2) The designed online dynamic decision-making method of generator start-up based on deep learning and Monte Carlo tree search can be used in different power systems for generator start-up;
3) The designed online dynamic decision-making method of generator start-up based on deep learning and Monte Carlo tree search can save online decision-making time by learning offline generated data with deep learning;
4) The designed online dynamic decision-making method of generator start-up based on deep learning and Monte Carlo tree search improve the robustness of schemes for uncertain situation by considering different possible subsequent restoration situations;
5) The designed online dynamic decision-making method of generator start-up based on deep learning and Monte Carlo tree search can rapidly response to the situation which is different from the expected restoration process and provide restoration schemes.

BRIEF DESCRIPTION OF THE DRAWINGS

Features and details of the present invention are described in, and will be apparent from, the following brief description of the drawings.

DETAILED DESCRIPTION OF THE EMBODIMENTS

Figure 1:
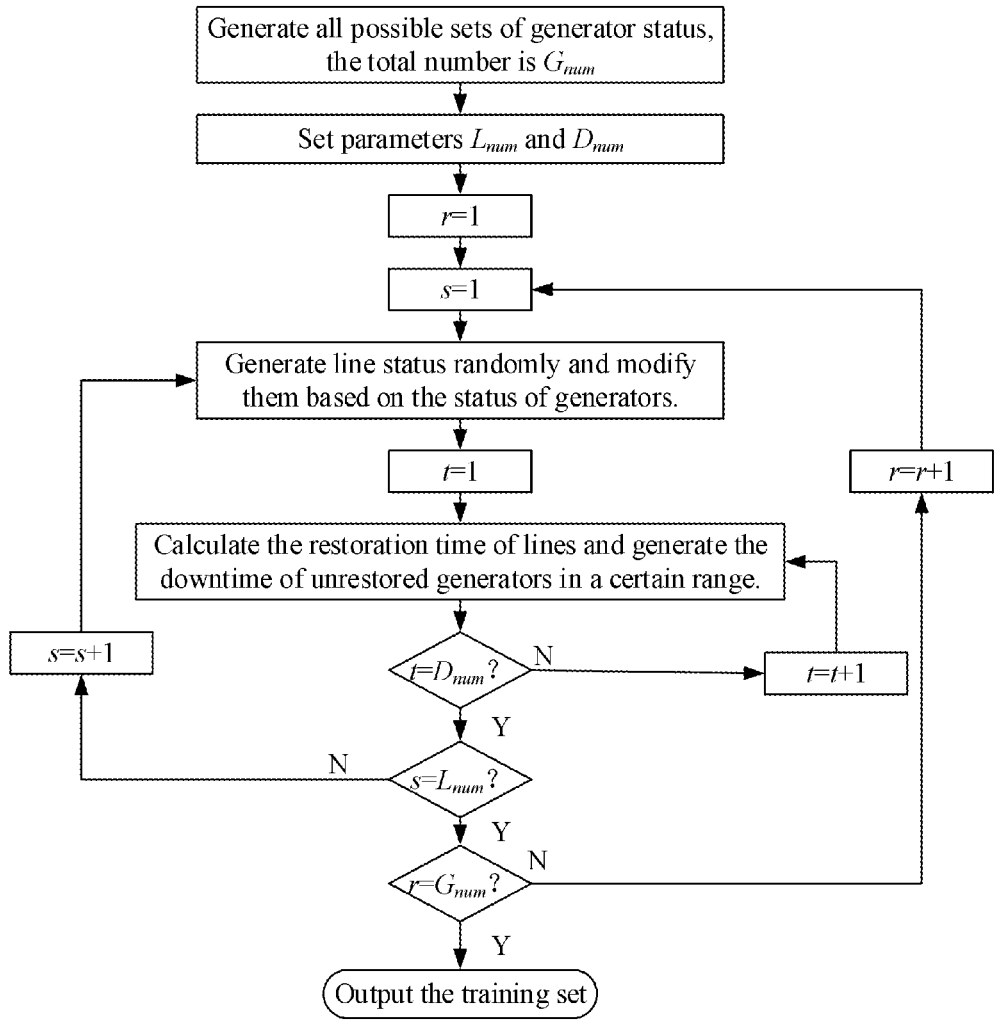
FIG. 1 illustrates the flowchart of training set generation.

The present invention is further described below in combination with the appended drawings and embodiments.

It is noted that the following detailed instructions are illustrative and are intended to provide further explanation to this application. Unless otherwise specified, all technical and scientific terms used herein have the same meaning as those commonly understood by ordinary technicians in the technical field to which this application belongs. It is important to note that the terms used here aim to describe specific implementation way, rather than restrict exemplary embodiments of the present invention.

The present invention discloses an online decision-making method for generator start-up, which includes the following steps:

(1) Determining a black start unit, and selecting the units that need to be started from all units;
(2) Generating a labeled training set that covers different possible states of generator start-up. Based on the training set, utilizing deep learning to establish a value network;
(3) Obtaining real-time data of generator start-up, judging blackout area and the availability of equipment in the system, and identifying the state of the system;

(4) Searching and evaluating alternative lines to be restored in next step with Monte Carlo tree search and value network. Checking the voltage, frequency and power flow variations caused by the restoration of different alternative lines;

(5) Summarizing the results of Monte Carlo tree search, and restoring the corresponding transmission lines;

In step (1), the power system needs to be determined, and the data of the system needs to be obtained. According to the actual situation of the power system, a hydro-power generator, pumped-storage power generator or gas turbine generator is selected as the black-start unit. During the generator start-up, because the restored units need to guarantee the frequency and voltage regulation of power systems, the unit capacity should not be small. Meanwhile, to avoid a shock to system caused by auxiliary machines start, the capacity of units to be started is between 300 MW and 600 MW. In addition, the capacity of the power plant which has the unit to be started is supposed to be big, and the units near critical loads are given priority. According to the above principles, the decision makers select units that need to be started from all units.

In step (2), the training set generation is an offline preparatory work before online decision making. Power system restoration is infrequent in the operation of power system. It is hard to find enough actual samples. One sample including the status of generators, the status of lines and the downtime of generators represents a possible power system situation during generator start-up. The specific steps of training set generation are shown as follows:

1) Generating all possible sets of generator status through traversal, wherein assuming there are N generators in a system, the number of sets of generator status needing to be generated is $C_N^1 + C_N^2 + \ldots + C_N^{N-1}$;

2) Setting that $L_{num}$ is the number of sets of line status when generator status is fixed and $D_{num}$ is the number of sets of generator downtime when generator and line status is fixed;

3) Generating line status randomly and verifying topological connectivity of the generated network based on a principle, wherein all restored lines are required to be able to connect the restored units and the black-start unit and adjusting the line status in the disconnected network;

4) Calculating expected recovery time of all restored lines and downtime of each unit;

5) Adopting a particle swarm optimization algorithm to optimize a maximum total generation capability in a generated power system situation for the corresponding total generation capability as a sample label, wherein the power system situation is represented as a certain sample.

The flowchart of training set generation is shown in FIG. 1.

The total generation capability is shown as follows:

$$E_{total} = \sum_{i=1}^{n_G} \int_0^T P_i(t)dt$$

where $E_{total}$ is the total generation capability in time T; T is a duration set by dispatchers; $n_G$ is the number of units; $P_i(t)$ is the output function of the ith unit.

Figure 2:
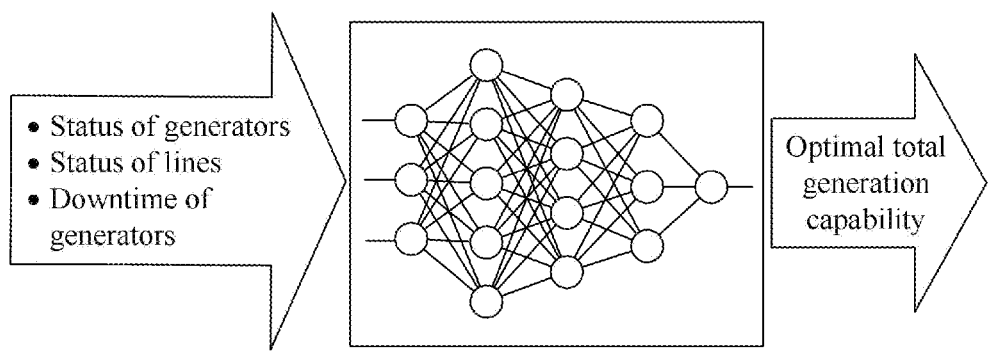
FIG. 2 illustrates the structure of deep neural network, which is trained by the training set.

In step (2), value network is a trained deep neural network, which is used in the simulation part of Monte Carlo tree search. It can evaluate the optimal total generation capability rapidly based on the power system situation. A deep neural network with 3 hidden layers is established based on sparse autoencoder to train the generated samples. The input data are the status of generators, the status of lines and the downtime of generators, while the output data is the optimal total generation capability. The structure of the value network is shown in FIG. 2.

In step (3), the state identification of system refers to availability diagnostics for all equipment and the downtime collection of all unrestored generators.

In step (4), a total generation capability is set as the search objective. During the search for the next line to be restored, the constraints about voltage, frequency and power flow are checked. The equation of the total generation and constraints are shown as follows:

$$E_{total} = \sum_{i=1}^{n_G} \int_0^T P_i(t)dt$$

$$\begin{cases} U_k^{min} < U_k < U_k^{max} \\ f^{min} < f < f^{max} \\ P_l < P_l^{max} \end{cases}$$

where $E_{total}$ is the total generation capability in time T; T is a duration set by dispatchers; $n_G$ is the number of units; $P_i(t)$ is the output function of the ith unit; $U_k$ is the voltage of the kth node; $U_k^{max}$ and $U_k^{min}$ are the top and bottom limitation of the voltage; f is the frequency of the system; $f^{min}$ and $f^{max}$ is the top and bottom limitation of the frequency; $P_l$ is the power flow of the lth line; $P_l^{max}$ is the power flow limitation of the lth line. Because the power system is vulnerable in the initial stage of power system restoration, $P_l^{max}$ is set to a value which is smaller than the static stability limit and thermal stability limit.

In step (4), Monte Carlo tree search is usually used to make an optimal decision in artificial intelligence games. Four steps including selection, expansion, simulation and backpropagation are included in the algorithm. The steps of online decision making of generator start-up based on Monte Carlo tree search and value network are shown as follows:

1) Selection. Starting from the root node, after calculating the MUCT value of each node, select the nodes with the largest MUCT value for further expansion or simulation. The equation of modified UCT value is shown as follows:

$$F_{MUCT} = \overline{X}_c^{70\%} + 2C_p \sqrt{\frac{2\ln n}{n_c}}$$

where $F_{MUCT}$ is the modified UCT value; $\overline{x}_c^{70\%}$ is the average value of 70% top indicators of node c; n is the visit times to the parent node of node c; $n_c$ is the visit time to node c; $C_p$ is a real number gather than 0.

2) Expansion. Move pruning can improve the search efficiency of MCTS by eliminating some poor child nodes. First, by searching reversely from the node which is waited to be expanded to the root node, the nodes which have the same parent node with the visited nodes are marked. Then, the marked nodes are avoided in the new expansion until a new NBS unit is linked to the backbone network.

Figure 3:
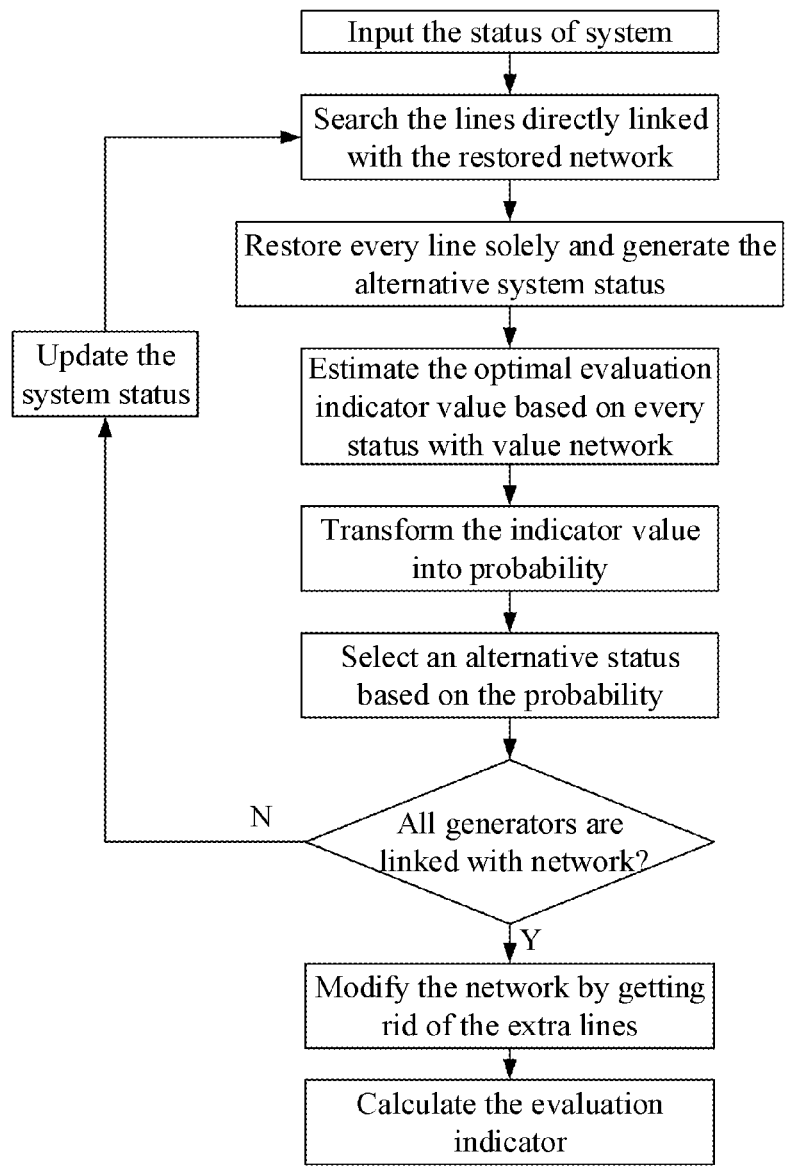
FIG. 3 illustrates the flowchart of generator start-up simulation based on value network.

3) Simulation. According to the status of the system, estimate subsequent optimal total generation capability with value network, and improve the selected probability of the alternatives with higher total generation capability to guide the simulation process. The flowchart of simulation is shown in FIG. 3.
4) Backpropagation. After the simulation is completed, update the parameters of each node in the tree reversely.

Figure 4:
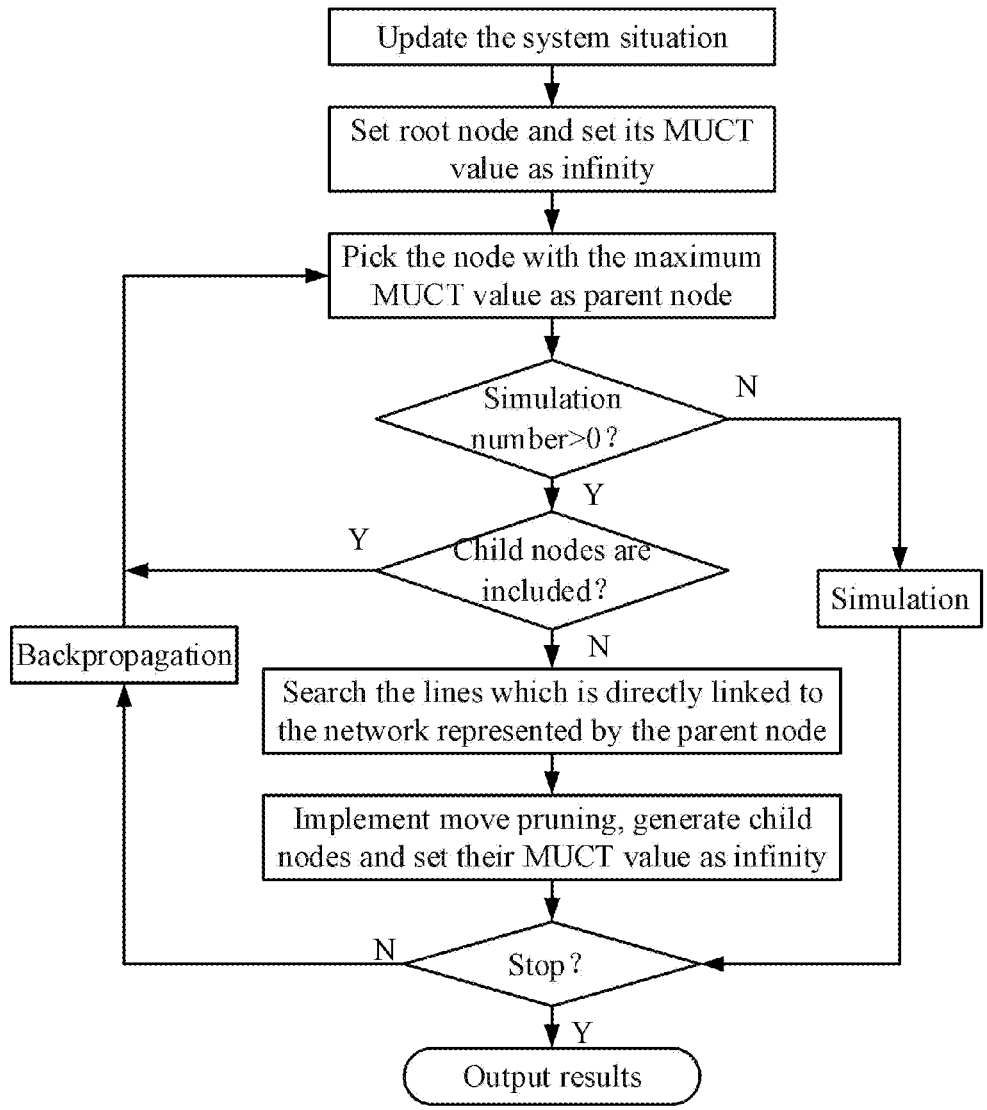
FIG. 4 illustrates the flowchart of search for generator start-up measure based on deep learning and Monte Carlo tree search.
Figure 5:
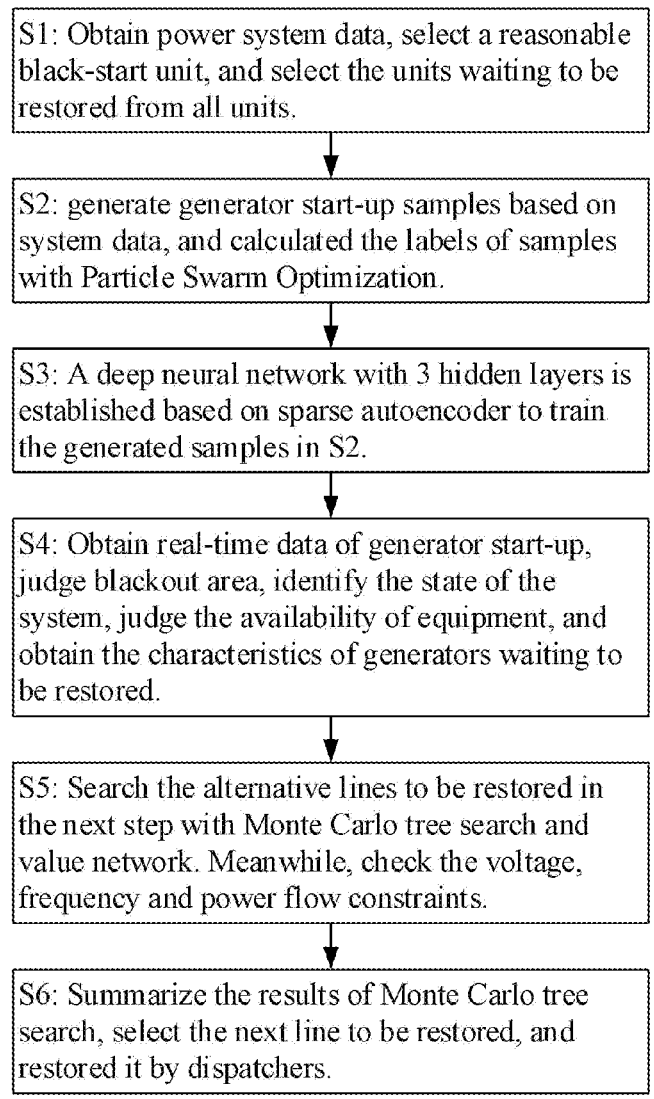
FIG. 5 illustrates the flowchart of online decision making of generator start-up based on deep learning and Monte Carlo tree search.

The flowchart of Monte Carlo tree search for generator start-up is shown in FIG. 4.

In step (5), the results of Monte Carlo tree search are summarized, and a weighted total generation capability is used as the decision objective to determine the line to be restored in next step. The weighted total generation capability is shown as follows:

$$f_m = \sum \frac{1}{x_{num}^{m,n}} E_{total}^{m,n}$$

where $f_m$, is the decision objective of the mth alternative; $x_{num}^{m,n}$ is the number of restored lines of the mth alternative in the nth simulation; $E_{total}^{m,n}$ is the total generation capability of the mth alternative in the nth simulation.

The present invention discloses a system for online decision making of generator start-up, including A module used to determine the black-start unit for generator start-up; A module used to select the units waiting to be restored from all units;

A module used to generate labeled training set that covers as much generator start-up status as possible;

A module used to establish value network;

A module used to obtain real-time data of generator start-up, judge blackout area, identify the state of the system, judge the availability of equipment in the system, and obtain the characteristics of generators waiting to be restored;

A module used to search the next line to be restored with Monte Carlo tree search and value network;

A module used to check the voltage, frequency and power flow variations caused by the restoration of alternative lines;

A module used to summarize the results of Monte Carlo tree search, and select the next restored transmission line.

The western Shandong power grid of China is used to demonstrate the process of the online decision making of generator start-up.

Figure 6:
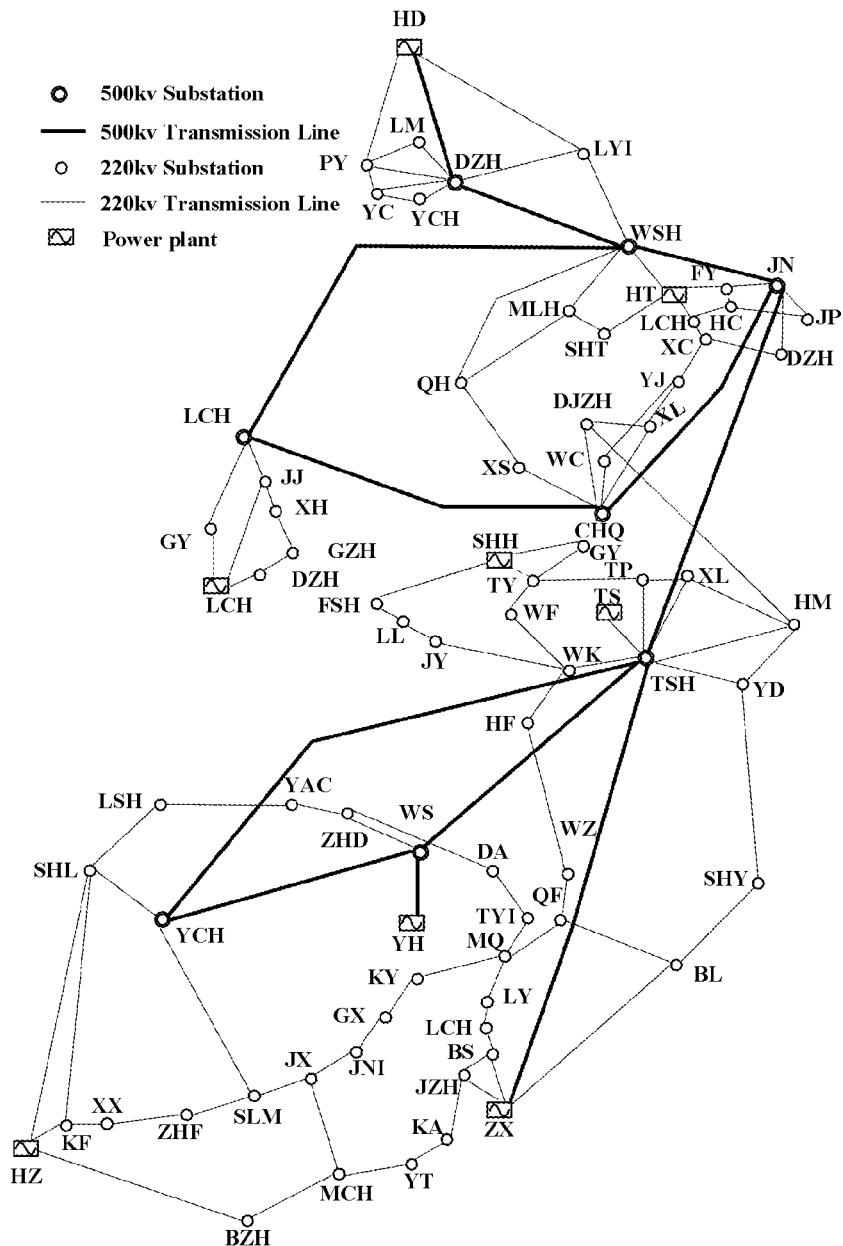
FIG. 6 illustrates the structure of the western Shandong power grid of China.

The structure of the western Shandong power grid of China is shown in FIG. 6. It is assumed that generators at ZX and HZ have been restored and the downtime of the other generator is 35 min. The online decision-making method is used to determine restoration actions of generator start-up step by step. The specific steps are shown as follows:

S1: Obtain power system data, select a reasonable black-start unit, and select the units waiting to be restored from all units.

During the generator start-up, because the restored units need to guarantee the frequency and voltage regulation of power systems, the unit capacity should not be small. Meanwhile, to avoid a shock to system caused by auxiliary machines start, the capacity of units to be started is between 300 MW and 600 MW. In addition, the capacity of the power plant which has the unit to be started is supposed to be big, and the units near critical loads are given priority. According to the above principles, the decision makers select the units that need to be started from all units.

The first choice of black start unit in the western Shandong power grid is the pumped storage power station at TS. The first generator at TS is an ideal black-start unit which has been adjusted several times and tested 3 times. In addition, the first generators at SHH, ZX, YH, HZ, HT, LCH and HD are selected as generators waiting to be restored.

S2: Generate generator start-up samples based on system data, and calculated the labels of samples with Particle Swarm Optimization. The sample data include the status of generators, the status of lines and the downtime of generators. This part is the offline preparatory work, which needs one week to generate 630 thousand samples. The specific steps of sample generation are shown as follows:

1) Generate all possible sets of generator status through traversal. There are 7 units waiting to be restored in the western Shandong power grid, the number of sets of generator status needing to be generated is 126.
2) Set $L_{num}$ to 100 and $D_{num}$ to 50. $L_{num}$ is the number of sets of line status when generator status is fixed and $D_{num}$ is the number of sets of generator downtime when the generator and line status is fixed.
3) Generate line status randomly, and verify the topological connectivity of the generated network. All restored lines are required to be able to connect the restored units and the black-start unit. Adjust the line status in the disconnected network.
4) Calculate the expected recovery time of all restored lines, and calculate the downtime of each unit basically. In a certain power network condition, the minimum downtime of generator is 0, while the maximum downtime of generator is the time which is needed to restoration all restored lines. Considering the uncertainty of restoration of transmission lines, the range of downtime of generators waiting to be restored is set from 0 to the time which is equal to the expected restoration time of all restored lines plus 10 min.
5) A PSO algorithm is adopted to optimize the maximum total generation capability in a generated power system situation, which is represented as a certain sample. The optimal generator start-up scheme is obtained and the corresponding total generation capability is calculated as a sample label.

S3: A deep neural network with 3 hidden layers is established based on sparse autoencoder to train the generated samples in S2. The structure of the network is [229 100 50 20 1], the text error of the trained neural network is about 3.5%.

S4: Obtain real-time data of generator start-up, judge blackout area, identify the state of the system, judge the availability of equipment in the system, and obtain the characteristics of generators waiting to be restored.

Based on the real-time data of system, at a moment, the generator at TS has started. Lines TS-TSH, ZX-TSH, YCH-TSH, YCH-SHL, SHL-HZ have been restored, and generators at ZH and HZ have linked with the restored network. All lines are available and their restoration is the same as the expected restoration time. The downtime of other generators is 35 min.

S5: Search and evaluate alternative lines to be restored in next step with Monte Carlo tree search and value network. Meanwhile, check the voltage, frequency and power flow variation caused by the restoration of every alternative line.

A total generation capability is set as the search objective. During the search for the next line to be restored, the constraints about voltage, frequency and power flow are checked. The equation of the total generation and constraints are shown as follows:

$$E_{total} = \sum_{i=1}^{n_G} \int_0^T P_i(t)dt$$

$$\begin{cases} U_k^{min} < U_k < U_k^{max} \\ f^{min} < f < f^{max} \\ P_l < P_l^{max} \end{cases}$$

where $E_{total}$ is the total generation capability in time T; T is a duration set by dispatchers; $n_G$ is the number of units; $P_i(t)$ is the output function of the ith unit; $U_k$ is the voltage of the kth node; $U_k^{max}$ and $U_k^{in}$ are the top and bottom limitation of the voltage; f is the frequency of the system; $f^{min}$ and $f^{max}$ is the top and bottom limitation of the frequency; $P_l$ is the power flow of the lth line; $P_l^{max}$ is the power flow limitation of the lth line. Because the power system is vulnerable in the initial stage of power system restoration, is set to a value which is smaller than the static stability limit and thermal stability limit.

The process of Monte Carlo tree search for generator start-up is shown as follows.

1) Selection. Starting from the root node, after calculating the MUCT value of each node, select the nodes with the largest MUCT value for further expansion or simulation. The equation of modified UCT value is shown as follows:

$$F_{MUCT} = \overline{X}_c^{70\%} + 2C_p \sqrt{\frac{2\ln n}{n_c}}$$

where $F_{MUCT}$ is the modified UCT value; $\overline{x}_c^{70\%}$ is the average value of 70% top indicators of node c; n is the visit times to the parent node of node c; $n_c$ is the visit time to node c; $C_p$ is a real number gather than 0.

2) Expansion. Move pruning can improve the search efficiency of MCTS by eliminating some poor child nodes. First, by searching reversely from the node which is waited to be expanded to the root node, the nodes which have the same parent node with the visited nodes are marked. Then, the marked nodes are avoided in the new expansion until a new NBS unit is linked to the backbone network.

3) Simulation. According to the status of the system, estimate subsequent optimal total generation capability with value network, and improve the selected probability of the alternatives with higher total generation capability to guide the simulation process.

4) Backpropagation. After the simulation is completed, update the parameters of each node in the tree reversely.

Figure 7:
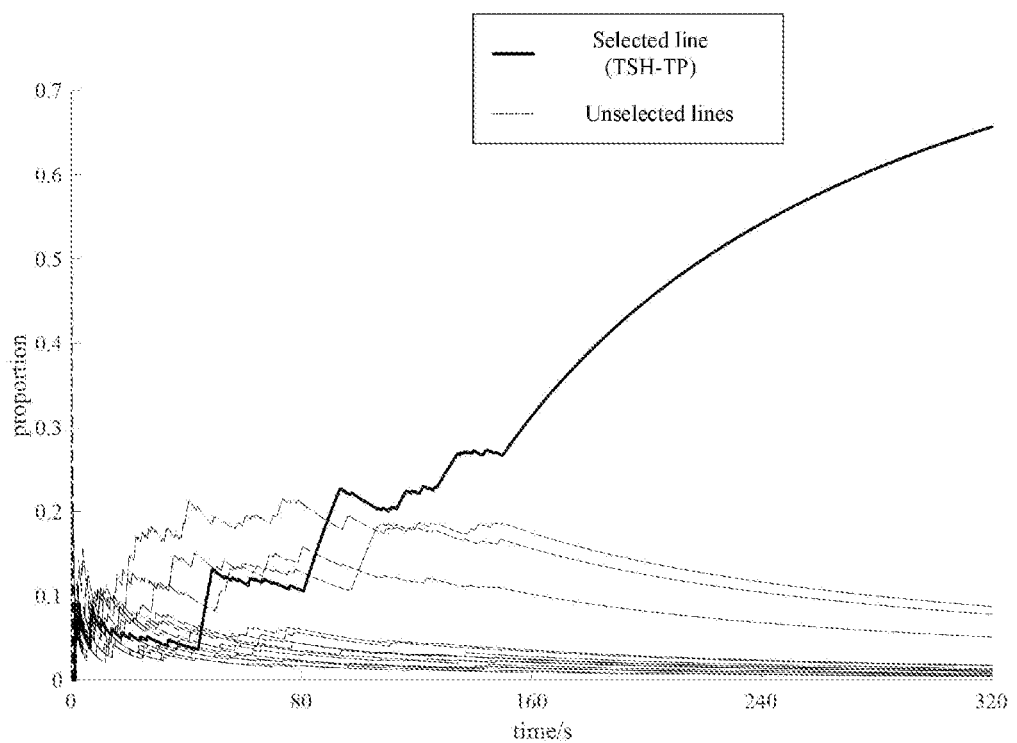
FIG. 7 illustrates the process of online decision making of generator start-up for the western Shandong power grid, in which the abscissa represents time, and the ordinate represents the proportion of the number of visit times to all alternative lines in the whole search process.

The run time of MCTS is set to 320 s, while the restoration time of the last restored line is 6 min. The search results are shown in FIG. 7. Along with the search, different alternatives are distinguished gradually. At the 100th second, the selected ratio of the final selected line TSH-TP is higher than other lines, and the gap is becoming wider and wider along with iteration.

S6: Summarize the results of Monte Carlo tree search, select the next line to be restored, and restored it by dispatchers.

The line TSH-TP is selected to be restored. The algorithm returns to S4 to select the next line to be restored until all generators are linked to the restored network.

The obtained generator start-up sequence is SHH, HT, HD, LCH, and YH. The corresponding line restoration sequence is TSH-TP, TP-TY, TY-SHH, TSH-JN, JN-WSH, WSH-HT, WSH-LYI, LYI-HD, WSH-LCH, LCH-GY, GY-LCH, TSH-WS, WS-YH.

Although the detailed description of the embodiments is shown above, the protection scope of the present invention is far beyond that. The technicians in the field shall understand that, on the basis of the technical scheme of the present invention, the modifications which is made without paying any creative labor is still within the protection scope of the present invention.

The invention claimed is:

1. An online dynamic decision-making method of generator start-up, the method comprising steps of:
    (1) selecting a black start generator unit and additional generator units that need to be started from all generator units;
    (2) generating a labeled training data set that includes different potential states of generator start-up, and applying a deep learning algorithm based on the training data set to establish a trained deep neural network;
    (3) obtaining real-time data of generator start-up including a blackout area, a state of a power system, an availability of equipment in the power system, and characteristics of generator units waiting to be restored of all of the generator units;
    (4) searching and evaluating all alternative power lines to be restored in a next step using a Monte Carlo tree search algorithm and the trained deep neural network by checking voltage, frequency, and power flow variations caused by restoring the different alternative power lines;
    (5) summarizing results of the Monte Carlo tree search algorithm to determine the corresponding transmission line to be restored of all alternative power lines; and
    (6) restoring the determined transmission line based on the summarized results of the Monte Carlo tree search algorithm.

2. The method of claim 1, wherein a hydro-power generator, a pumped-storage power generator, or a gas turbine generator is selected as the black-start generator unit based on a current state of the power system.

3. The method of claim 1, wherein the generator units that need to be started are selected from all of the generator units based on:
    selecting the generator units having a capacity between 300 MW and 600 MW;
    selecting the generator units corresponding to large-scale capacity power plants; and
    selecting the generator units located in an area of critical loads.

4. The method of claim 1, wherein according to the obtained real-time data, the labeled training data set is generated by:
    generating all possible sets of generator status through traversal, wherein N denotes a number of generator units in the power system, C denotes a number of possible generator status, such that the number of sets of generator status needing to be generated is represented by:

$C_N^1 + C_N^2 + \ldots + C_N^{N-1}$;

setting a number of sets of line status when generator status is fixed and a number of sets of generator downtime when one of the generator units and the line status are fixed;

generating the line status randomly and verifying topological connectivity of the generated network based on a principle that all restored lines are required to be able to connect the restored generator units and the black-start generator unit, and adjusting the line status in a disconnected network;

calculating expected recovery time of all restored lines and downtime of each generator unit; and executing a particle swarm optimization algorithm to optimize a maximum total generation capability in a generated power system situation for a corresponding total generation capability as a sample label, the power system situation being represented as a certain sample.

5. The method of claim 1, wherein the trained deep neural network is implemented to evaluate an optimal total generation capability of the power system based on a power system situation.

6. The method of claim 5, wherein the deep neural network is formed with three hidden layers based on sparse autoencoder to learn generated samples for the trained deep neural network, and input data to the trained deep neural network are status of the generator units, status of transmission lines, and downtime of generator units, and output data is the optimal total generation capability.

7. The method of claim 1, wherein the Monte Carlo tree search algorithm is implemented to perform an optimal decision in artificial intelligence games including selection, expansion, simulation and back propagation, the implanting of the Monte Carlo tree search algorithm includes the following steps:

Selection: starting from a root node, after calculating modified upper confidence bound apply to tree (MUCT) value of each node, and selecting a node with a largest MUCT value for further expansion or simulation;

Expansion: eliminating the nodes which represent impossible generator unit start-up situations in reality with a move pruning technique;

Simulation: estimating subsequent optimal total generation capability with the trained deep neural network according to the state of the power system, and improving a selected probability of the alternative transmission lines with a higher total generation capability to guide the simulation process; and Backpropagation: updating parameters of each node in the Monte Carlo tree search algorithm reversely after the simulation is completed.

8. The method of claim 7, wherein the MUCT value of a node is determined by a top p % total generation capability of simulation results, visit times to the node, and visit times to a parent node of the node.

9. The method of claim 7, wherein the move pruning technique includes marking the nodes which have the same parent node with a visited nodes by searching reversely from the node which is waited to be expanded to the root node, and avoiding the marked nodes in a new expansion until a new generator unit is linked to a backbone network.

10. The method of claim 1, wherein a weighted total generation capability is maximized to determine the next alternative transmission line to be restored, and the weighted total generation capability of an mth alternative transmission line is equal to a sum of a ratio between the total generation capability of a simulation and a number of transmission lines to be restored in the simulation.

11. A system for network-based decision making of generator start-up, the system comprising at least one computer configured to:

determine a black-start generator unit for generator start-up;

select a plurality of generator units waiting to be restored from all generator units;

generate a labeled training data set that includes potential statuses of generator start-up;

execute a deep learning algorithm based on the training data set to establish a trained deep neural network;

obtain real-time data of generator start-up, and determine a blackout area, a state of a power system, an availability of equipment in the power system, and characteristics of generator units waiting to be restored of all of the generator units;

search and evaluate all alternative power lines to be restored in a next step using a Monte Carlo tree search algorithm and the trained deep neural network by checking voltage, frequency, and power flow variations caused by restoring the different alternative power lines;

summarize results of the Monte Carlo tree search algorithm to determine the corresponding transmission line to be restored of all the alternative power lines; and restore the determined transmission line based on the summarized results of the Monte Carlo tree search algorithm.

* * * * *